(12) United States Patent
Tsuji

(10) Patent No.: US 10,484,591 B2
(45) Date of Patent: Nov. 19, 2019

(54) FOCUS ADJUSTING APPARATUS, FOCUS ADJUSTING METHOD, AND IMAGE CAPTURING APPARATUS

(71) Applicant: CANON KABUSHIKI KAISHA, Tokyo (JP)

(72) Inventor: Ryosuke Tsuji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 15/635,568

(22) Filed: Jun. 28, 2017

(65) Prior Publication Data

US 2018/0007254 A1 Jan. 4, 2018

(30) Foreign Application Priority Data

Jun. 30, 2016 (JP) ................. 2016-131036

(51) Int. Cl.

| | |
|---|---|
| *G03B 3/00* | (2006.01) |
| *H04N 5/232* | (2006.01) |
| *G03B 13/36* | (2006.01) |
| *H04N 9/077* | (2006.01) |
| *G03B 17/14* | (2006.01) |
| *G01S 3/00* | (2006.01) |
| *H04N 9/04* | (2006.01) |

(52) U.S. Cl.
CPC ........... *H04N 5/23212* (2013.01); *G01S 3/00* (2013.01); *G03B 13/36* (2013.01); *G03B 17/14* (2013.01); *H04N 5/23254* (2013.01); *H04N 5/232122* (2018.08); *H04N 5/232127* (2018.08); *H04N 9/045* (2013.01); *H04N 9/077* (2013.01)

(58) Field of Classification Search
None
See application file for complete search history.

(56) References Cited

U.S. PATENT DOCUMENTS 5,262,820 A * 11/1993 Tamai ...................... G02B 7/28
348/E5.046
5,625,434 A * 4/1997 Iwane ...................... G02B 7/36
396/95

(Continued)

FOREIGN PATENT DOCUMENTS

| JP | 2001-021794 A | 1/2001 |
|---|---|---|
| JP | 2002-251380 A | 9/2002 |

(Continued)

*Primary Examiner* — Jefferey F Harold
*Assistant Examiner* — Humam M Satti
(74) *Attorney, Agent, or Firm* — Cowan, Liebowitz & Latman, P.C.

(57) ABSTRACT

In a focus adjusting apparatus, a tracking unit detects from an image signal an area of a subject to be tracked, a position of an imaging plane of the area and reliability of the position, and a prediction unit predicts a position of an imaging plane when the image signal was obtained based on a history of detected positions of imaging planes. A setting unit sets a tolerance based on the reliability, and a determination unit determines the area of the detected subject as a focus adjustment area if a difference between the predicted and detected positions is within the tolerance. The prediction unit predicts a position of an imaging plane of the subject in the focus adjustment area at a future time point.

17 Claims, 11 Drawing Sheets

(56) References Cited

U.S. PATENT DOCUMENTS

| | | | | |
|---|---|---|---|---|
| 5,649,241 A * | 7/1997 | Watanabe | | G02B 7/34 |
| | | | | 396/104 |
| 5,787,314 A * | 7/1998 | Iwane | | G02B 7/28 |
| | | | | 396/95 |
| 6,311,019 B1 * | 10/2001 | Ide | | G02B 7/34 |
| | | | | 396/104 |
| 7,224,397 B2 * | 5/2007 | Sasaki | | H04N 5/2256 |
| | | | | 348/208.12 |
| 7,609,958 B2 * | 10/2009 | Border | | H04N 5/23212 |
| | | | | 348/348 |
| 7,734,165 B2 * | 6/2010 | Mizutani | | G02B 7/36 |
| | | | | 396/104 |
| 7,821,570 B2 * | 10/2010 | Gallagher | | G06T 5/20 |
| | | | | 348/221.1 |
| 7,940,306 B2 * | 5/2011 | Okumura | | H04N 5/2253 |
| | | | | 348/208.12 |
| 8,184,857 B2 * | 5/2012 | Akita | | G06T 7/269 |
| | | | | 348/143 |
| 8,254,773 B2 * | 8/2012 | Muramatsu | | G02B 7/08 |
| | | | | 348/346 |
| 8,405,759 B2 * | 3/2013 | Kunishige | | H04N 5/23293 |
| | | | | 348/208.12 |
| 8,823,861 B2 * | 9/2014 | Yoshida | | G03B 13/36 |
| | | | | 348/208.12 |
| 9,344,621 B2 * | 5/2016 | Omata | | G02B 7/34 |
| 9,654,685 B2 * | 5/2017 | Koryakovskiy | ... | H04N 5/23219 |
| 9,749,563 B2 * | 8/2017 | Yamazaki | | G02B 7/38 |
| 2005/0104993 A1 * | 5/2005 | Matsumoto | | G02B 7/102 |
| | | | | 348/345 |
| 2011/0234885 A1 * | 9/2011 | Muramatsu | | G03B 35/18 |
| | | | | 348/345 |
| 2015/0201182 A1 * | 7/2015 | Chang | | H04N 5/23212 |
| | | | | 348/47 |

FOREIGN PATENT DOCUMENTS

| | | |
|---|---|---|
| JP | 2012-208507 A | 10/2012 |
| JP | 5882593 B | 3/2016 |

* cited by examiner

FOCUS ADJUSTING APPARATUS, FOCUS ADJUSTING METHOD, AND IMAGE CAPTURING APPARATUS

BACKGROUND OF THE INVENTION

Field of the Invention

The present invention relates to a focus adjusting apparatus, a focus adjusting method, and an image capturing apparatus including the focus adjusting apparatus, and especially to a focus adjusting apparatus and a focus adjusting method that perform focus adjustment based on subject tracking, and an image capturing apparatus including the focus adjusting apparatus.

Description of the Related Art

In recent years, focus adjusting apparatuses for tracking a moving subject with high precision have been proposed in large numbers. Japanese Patent Laid-Open No. 2001-21794 discloses a method of tracking a movement of a subject in the optical axis direction with high precision, specifically, a focus adjusting apparatus for improving the tracking performance by predicting the position of a future imaging plane of a moving subject. According to Japanese Patent Laid-Open No. 2001-21794, a plurality of past focus detection results are stored, and a function that is most suitable for prediction of a change in the position of the future imaging plane of the subject is selected.

On the other hand, Japanese Patent Laid-Open No. 2012-208507 discloses a method of selecting a tracking position that satisfies predetermined conditions from among a tracking position based on image features of a shot image, a tracking position obtained by prediction based on the past focus detection results, and a position that has been arbitrarily designated (starting detection point). Furthermore, the specification of Japanese Patent No. 5882593 discloses a focus adjusting method that uses both tracking based on image features and the position of an imaging plane obtained by prediction based on the past focus detection results.

Japanese Patent Laid-Open No. 2001-21794 has the risk of tracking failure in the case of movements that cannot be predicted from the past detection results. On the other hand, according to Japanese Patent Laid-Open No. 2012-208507, a position that is designated by a user at the start of shooting is prioritized in the case of unpredictable movements. However, the user needs to keep capturing a subject to be tracked at a predetermined position on a screen; this operation is difficult for a user who is not experienced in operating a camera. The specification of Japanese Patent No. 5882593 takes into account a sudden change in motion characteristics by changing the position of a focus detection area, whose defocus amount is referenced in prediction, in accordance with the result of tracking based on image features. However, it does not sufficiently take into account a case in which the tracking based on image features is erroneous.

SUMMARY OF THE INVENTION

The present invention has been made in consideration of the above situation, and performs appropriate focus adjustment with respect to a tracked subject that moves irregularly in the optical axis direction while preventing a malfunction caused by erroneous tracking.

According to the present invention, provided is a focus adjusting apparatus, comprising at least one processor or one circuitry which functions as: a tracking unit that detects an area of a subject to be tracked, a position of an imaging plane of the area, and reliability of the position of the imaging plane from an image signal that has been output from an image sensor through photoelectric conversion of light incident on the image sensor; a prediction unit that predicts a position of an imaging plane at a preset time point based on a history of positions of imaging planes detected by the tracking unit; a setting unit that sets a tolerance for positions of imaging planes based on the reliability detected by the tracking unit; and a determination unit that determines the area of the subject detected by the tracking unit as a focus adjustment area in a case where a difference between a position that has been predicted by the prediction unit as a position of an imaging plane at a time point of shooting associated with the image signal and the position of the imaging plane detected by the tracking unit is within the tolerance.

Further, according to the present invention, provided is an image capturing apparatus, comprising at least one processor or one circuitry which functions as: an image sensor that outputs an image signal through photoelectric conversion of light incident thereon; and the focus adjusting apparatus that includes: a tracking unit that detects an area of a subject to be tracked, a position of an imaging plane of the area, and reliability of the position of the imaging plane from the image signal that has been output from the image sensor; a prediction unit that predicts a position of an imaging plane at a preset time point based on a history of positions of imaging planes detected by the tracking unit; a setting unit that sets a tolerance for positions of imaging planes based on the reliability detected by the tracking unit; and a determination unit that determines the area of the subject detected by the tracking unit as a focus adjustment area in a case where a difference between a position that has been predicted by the prediction unit as a position of an imaging plane at a time point of shooting associated with the image signal and the position of the imaging plane detected by the tracking unit is within the tolerance.

Furthermore, according to the present invention, provided is a focus adjusting method, comprising: detecting an area of a subject to be tracked, a position of an imaging plane of the area, and reliability of the position of the imaging plane from an image signal that has been output from an image sensor through photoelectric conversion of light incident on the image sensor; predicting a position of an imaging plane at a time point of shooting associated with the image signal based on a history of detected positions of imaging planes; setting a tolerance for positions of imaging planes based on the detected reliability; and determining the detected area of the subject as a focus adjustment area in a case where a difference between the predicted position of the imaging plane at the time point of shooting associated with the image signal and the detected position of the imaging plane is within the tolerance.

Further, according to the present invention, provided is a computer-readable storage medium having stored therein a program for causing a computer to function as the units of the focus adjusting apparatus that comprises: a tracking unit that detects an area of a subject to be tracked, a position of an imaging plane of the area, and reliability of the position of the imaging plane from an image signal that has been output from an image sensor through photoelectric conversion of light incident on the image sensor; a prediction unit that predicts a position of an imaging plane at a preset time point based on a history of positions of imaging planes detected by the tracking unit; a setting unit that sets a tolerance for positions of imaging planes based on the reliability detected by the tracking unit; and a determination unit that determines the area of the subject detected by the tracking unit as a focus adjustment area in a case where a difference between a position that has been predicted by the prediction unit as a position of an imaging plane at a time point of shooting associated with the image signal and the position of the imaging plane detected by the tracking unit is within the tolerance.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

[Overall Configuration]

Figure 1A:
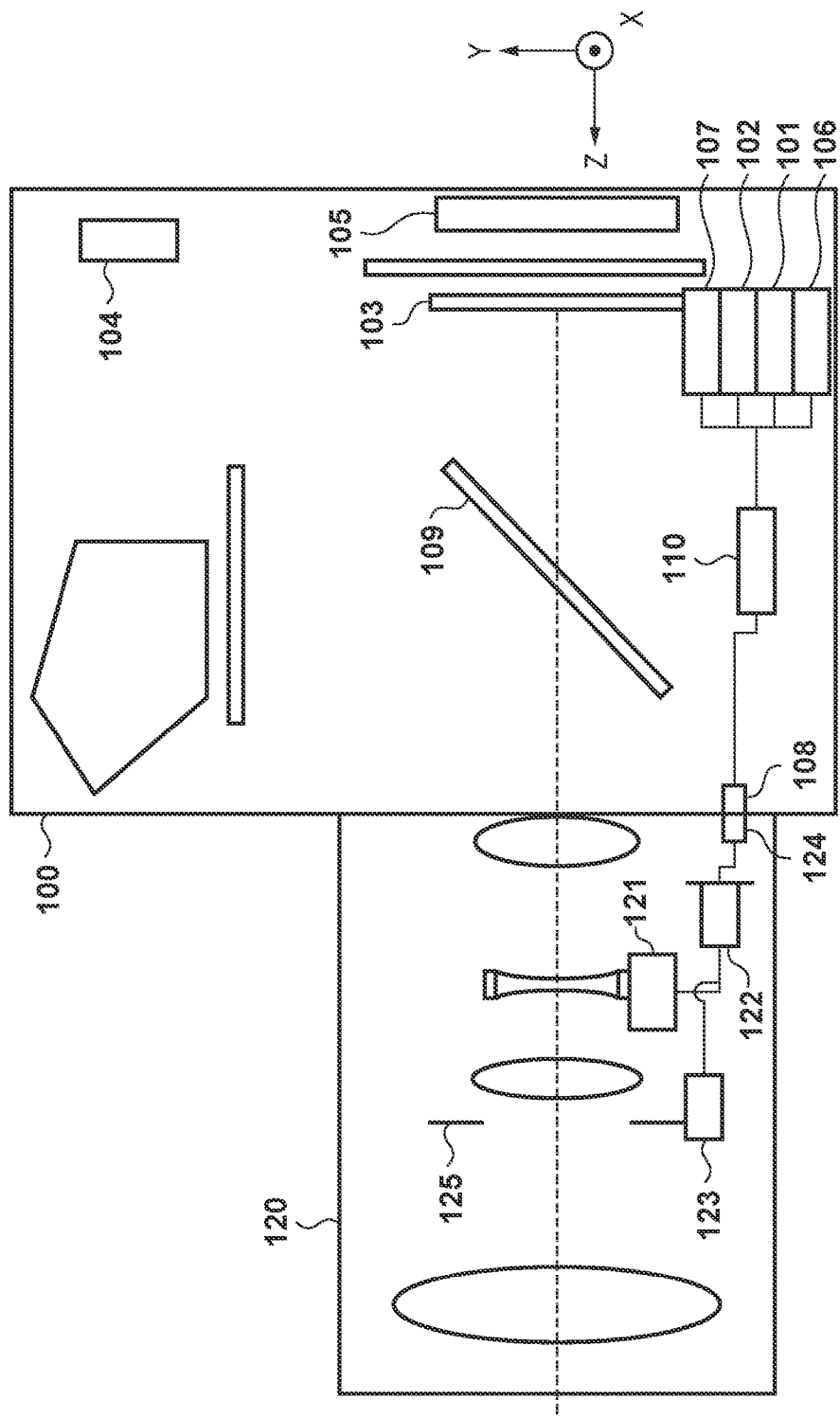
FIG. 1A is a cross-sectional view of an image capturing apparatus according to an embodiment of the present invention.
Figure 1B:
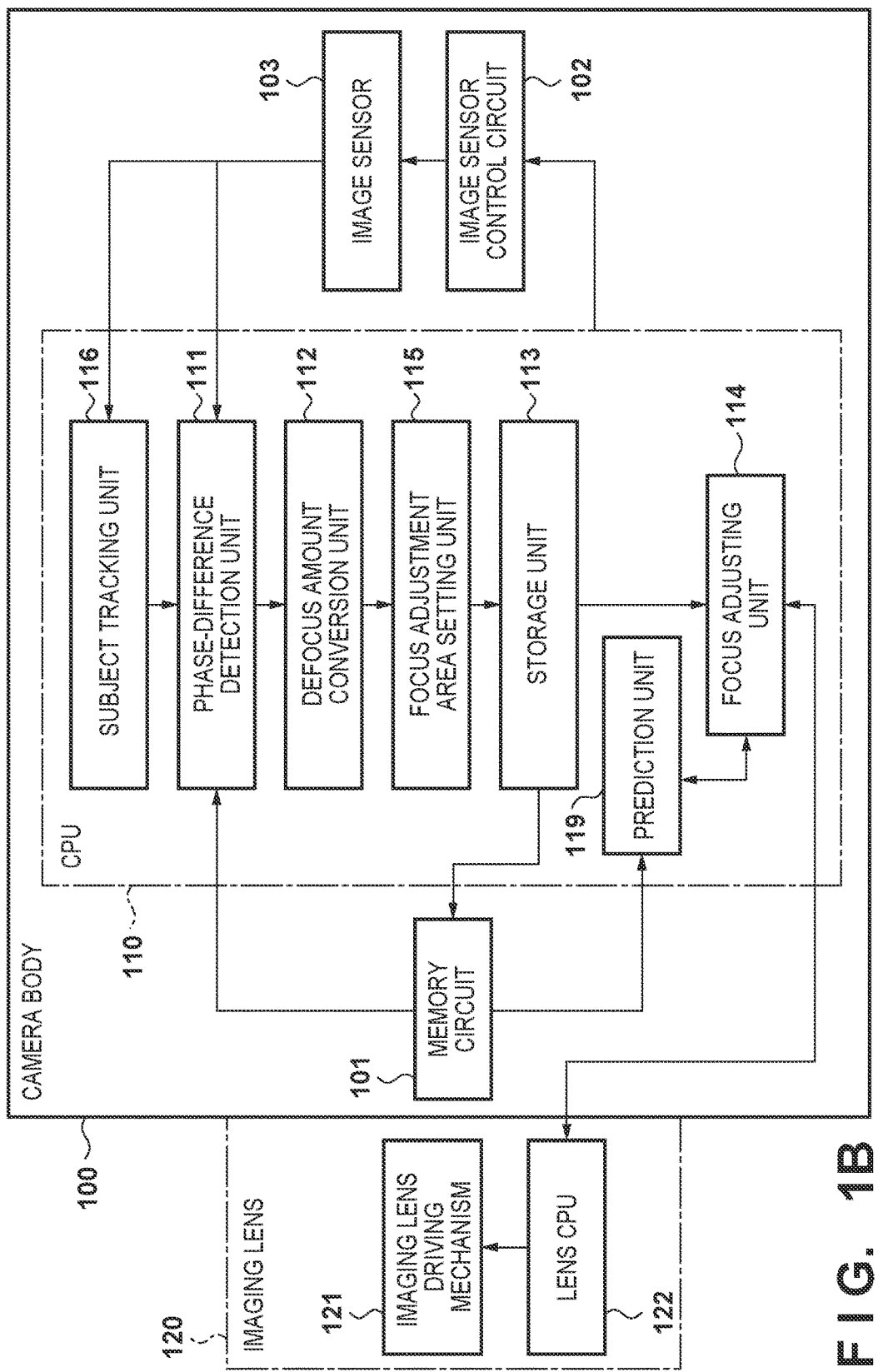
FIG. 1B is a block diagram showing a functional configuration of the image capturing apparatus.

FIGS. 1A and 1B show an overall configuration of an image capturing apparatus according to an embodiment of the present invention; specifically, FIG. 1A is a cross-sectional view of the image capturing apparatus, and FIG. 1B is a block diagram showing a functional configuration of the image capturing apparatus. In general, a camera has two types of modes: a mode for driving a lens relative to an imaging plane of a subject at certain time (one-shot shooting mode), and a mode for driving the lens while predicting a future imaging plane of the subject (servo shooting mode). In the present embodiment, the operations performed when the image capturing apparatus is set to the servo shooting mode will be described.

In the present embodiment, an interchangeable-lens digital still camera, which uses a camera body 100 provided with a viewfinder 104 and an image sensor 103 in combination with an imaging lens 120 provided with an imaging optical system, will be described as the image capturing apparatus. Note that the present invention is not limited to being applied to the interchangeable-lens digital still camera, and can be applied to a variety of optical devices that can perform focus adjustment based on image signals.

The camera body 100 includes the image sensor 103, the viewfinder 104, a display 105, a CPU 110, an image sensor control circuit 102, a memory circuit 101, an interface circuit 106, an image processing circuit 107, an electric contact 108, and a quick return mirror 109.

The image sensor 103 is constituted by, for example, a complementary metal-oxide-semiconductor (CMOS) image sensor or a charge-coupled device (CCD) image sensor, and is placed in the camera body 100 on a planned image forming plane of the imaging lens 120. In the present embodiment, the image sensor 103 will be described as the CMOS image sensor.

Figure 2A:
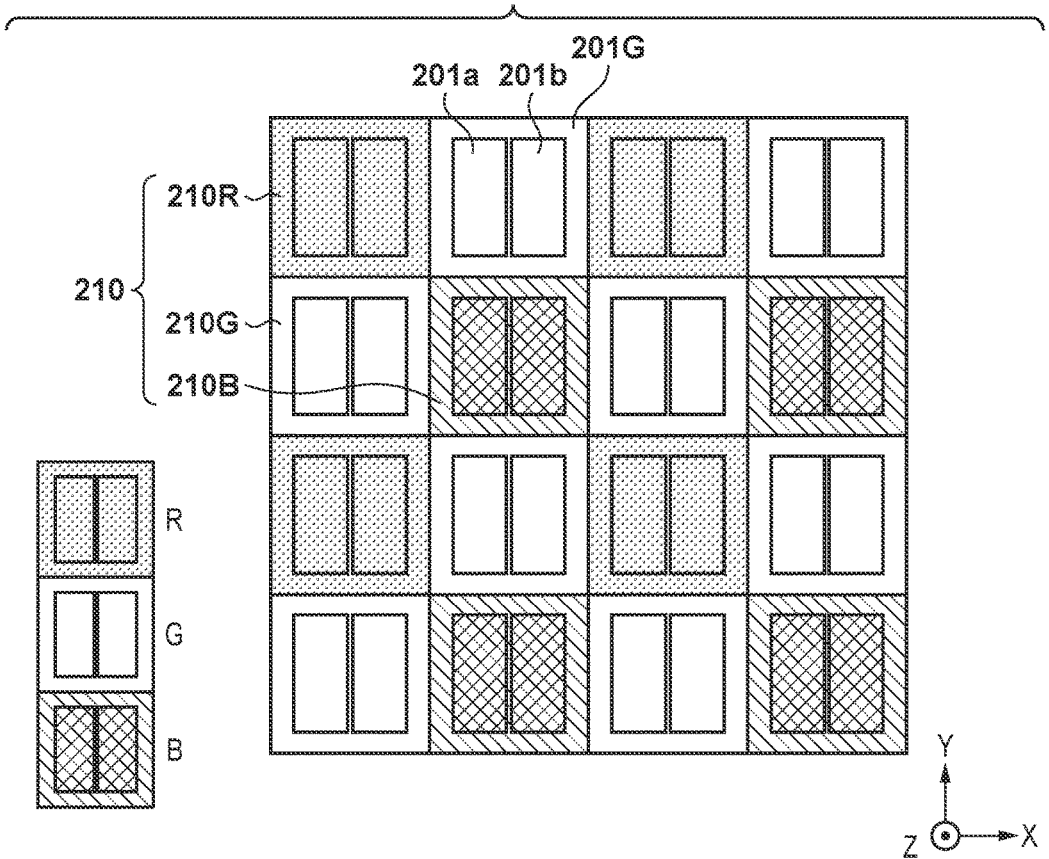
FIGS. 2A and 2B show a structure of an image sensor according to the embodiment.
Figure 2B:
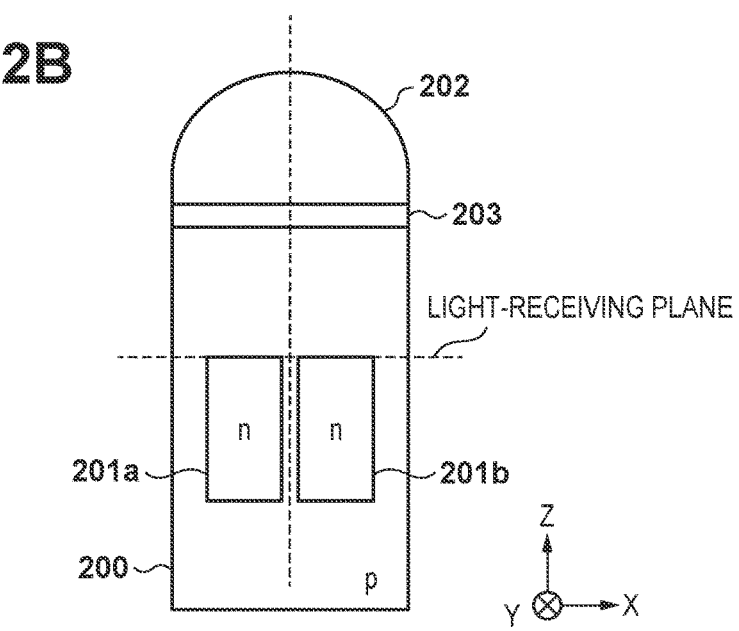

A pixel structure of the image sensor 103 according to the present embodiment will now be described with reference to FIGS. 2A and 2B. FIGS. 2A and 2B show the pixel structure of the image sensor 103; specifically, FIG. 2A is a plan view of a pixel array in the image sensor 103, and FIG. 2B is a cross-sectional view of a pixel 210G.

FIG. 2A shows part of the pixel array in the image sensor 103 in a range of four rows and four columns. A pixel group 210 includes pixels that are arranged in two rows and two columns in accordance with the Bayer array, that is, an upper-left pixel 210R with spectral sensitivity for red (R), upper-right and lower-left pixels 210G with spectral sensitivity for green (G), and a lower-right pixel 210B with spectral sensitivity for blue (B). Each of the pixels 210R, 210G, and 210B includes two photoelectric conversion portions 201$a$ and 201$b$ for pupil division. Each photoelectric conversion portion 201$a$ receives a light beam that has passed through a first pupil area of an exit pupil of the imaging lens 120, and performs photoelectric conversion. Each photoelectric conversion portion 201$b$ receives a light beam that has passed through a second pupil area different from the first pupil area, and performs photoelectric conversion. The pixels structured in the foregoing manner function as imaging pixels and focus detection pixels.

As shown in FIG. 2B, the photoelectric conversion portions 201$a$ and 201$b$ are constituted by photodiodes each of which is composed of a p-type layer 200 and an n-type layer. On a color filter 203, a microlens 202 is placed at a position that is away from a light-receiving plane in the Z direction by a predetermined distance.

In the present embodiment, every one of the pixels 210R, 210G, and 210B of the image sensor 103 includes the photoelectric conversion portions 201$a$ and 201$b$ for pupil division. The two photoelectric conversion portions 201$a$ and 201$b$ enable pupil division using one microlens 202 as they are decentered respectively in the +X direction and the −X direction with respect to an optical axis of the microlens 202. Therefore, pixels including the photoelectric conversion portions 201$a$ and 201$b$ are used as focus detection pixels. Although it will be assumed herein that all pixels are structured as focus detection pixels, the present invention is not limited in this way, and only a part of the entirety of the pixels may be structured as focus detection pixels. Furthermore, although FIG. 2A shows an exemplary arrangement in which the photoelectric conversion portions 201$a$ and 201$b$ are decentered in the X direction with respect to the optical axis of the microlens 202, other arrangements are possible; for example, the photoelectric conversion portions may be decentered in the Y direction, or alternatively, some photoelectric conversion portions may be decentered in the X direction while others are decentered in the Y direction. These arrangements support not only subjects having a luminance distribution in the X direction, but also subjects having a luminance distribution in the Y direction. All or a part of the pixels in the image sensor 103 may include two or more photoelectric conversion portions.

Figure 3:
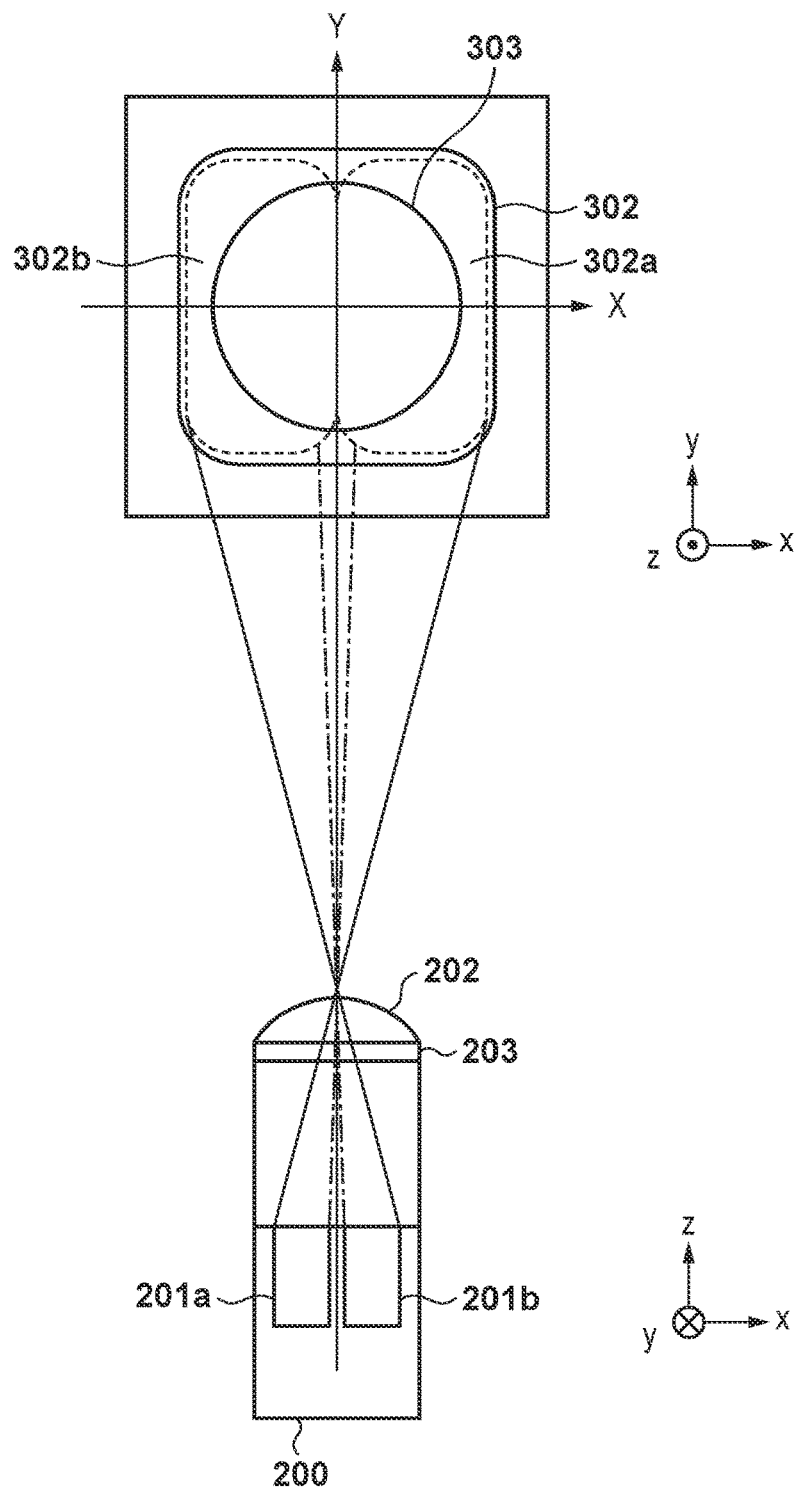
FIG. 3 is a schematic view illustrating a pixel structure and pupil division according to the embodiment.

A pupil division function of the image sensor 103 will now be described with reference to FIG. 3. FIG. 3 illustrates the pupil division function of the image sensor 103, and shows how pupil division is performed on a single pixel. Note that in FIG. 3, the constituent parts that are the same as the constituent parts shown in FIG. 2B are given the same reference numerals thereas.

An upper part of FIG. 3 shows an exit pupil 302 and an aperture frame 303 (e.g., a diaphragm frame or a lens frame). The exit pupil 302 includes pupil areas 302a and 302b that correspond to the photoelectric conversion portions 201a and 201b, respectively. An image signal A is obtained by the photoelectric conversion portion 201a, which is equivalent to the n-type layer decentered in the −X direction. An image signal B is obtained by the photoelectric conversion portion 201b, which is equivalent to the n-type layer decentered in the +X direction.

In the present embodiment, an image signal A is obtained from the plurality of photoelectric conversion portions 201a that are arrayed regularly in the X direction as shown in FIG. 2A. That is, an image signal A is obtained from one of a pair of light beams that has passed through a part of an exit pupil area of the imaging optical system and that has different base-line lengths depending on the f-number. On the other hand, an image signal B is obtained from the plurality of photoelectric conversion portions 201b that are arrayed regularly in the X direction as shown in FIG. 2A. That is, an image signal B is obtained from the other of the pair of light beams that has passed through a different part of the exit pupil area of the imaging optical system and that has different base-line lengths depending on the f-number.

Referring back to FIGS. 1A and 1B, when the quick return mirror 109 is on an optical path to the image sensor 103, it reflects an imaging light beam from the imaging lens 120 toward the viewfinder 104. The viewfinder 104 enables an operator to observe a subject image reflected by the quick return mirror 109. During shooting and a live-view mode, the quick return mirror 109 withdraws from the optical path, thereby enabling a light beam incident via the imaging lens 120 to arrive at the image sensor 103. Although not illustrated, a shutter provided between the quick return mirror 109 and the image sensor 103 is opened during shooting and the live-view mode.

The image sensor control circuit 102 drives and controls the image sensor 103 in accordance with an instruction from the CPU 110. The memory circuit 101 stores images captured by the image sensor 103, as well as a distribution of light received by the image sensor 103. The image processing circuit 107 applies image processing to image signals obtained through shooting performed by the image sensor 103. The interface circuit 106 is used to output, to the outside of the camera, images to which the image processing circuit 107 has applied the image processing. The electric contact 108 comes into contact with an electric contact 124 in the imaging lens 120, and is used in communication of electric power and various types of signals.

The display 105 is composed of, for example, a liquid crystal display (LCD) panel, and displays shot images, shooting information, and so forth. During the live-view mode, the display 105 displays moving images of a planned shooting area in real time. Herein, the live-view mode denotes a mode for reading out subject images that were incident via the imaging lens 120 and formed on the image sensor 103 as low-resolution preview moving images, and displaying the subject images on the display 105 in real time. During this live-view mode, phase-difference AF on an image capturing plane can be performed as will be described later. Furthermore, during continuous shooting, the display 105 displays low-resolution still images obtained through the continuous shooting.

The CPU 110 is a control unit that controls the entire camera integrally. The CPU 110 includes a phase-difference detection unit 111, a subject tracking unit 116, a defocus amount conversion unit 112, a focus adjustment area setting unit 115, a storage unit 113, a focus adjusting unit 114, and a prediction unit 119, calculates a focusing state of the imaging lens 120, and issues a driving instruction.

The phase-difference detection unit 111 detects a relative phase difference between a pair of an image signal A and an image signal B obtained from the image sensor 103, and the defocus amount conversion unit 112 converts the phase difference detected by the phase-difference detection unit 111 into a defocus amount using a conversion coefficient. Based on the features of image signals obtained from the image sensor 103, the subject tracking unit 116 calculates an area of a subject to be tracked (hereinafter, "tracking area"), a position of the subject to be tracked (hereinafter, "tracking position"), and the reliability of tracking (tracking likelihood). Based on the tracking area, tracking position, and reliability detected by the subject tracking unit 116, the focus adjustment area setting unit 115 determines an area to be focused on by the focus adjusting unit 114. The storage unit 113 stores, to the memory circuit 101, the shooting time (a time point of shooting) and a position of an imaging plane of the tracking area calculated from the converted defocus amount.

The focus adjusting unit 114 instructs a lens CPU 122 to move a focus position based on the converted defocus amount. Furthermore, the focus adjusting unit 114 predicts a position of a future imaging plane using a prediction unit 119, calculates a lens driving amount that is necessary for moving a focus position of the imaging lens 120 to the predicted position of the future imaging plane, and issues an instruction to the lens CPU 122 accordingly.

The imaging lens 120 is an interchangeable lens that is attachable to and detachable from the camera body 100. The imaging lens 120 includes the lens CPU 122, an imaging lens driving mechanism 121, a diaphragm driving mechanism 123, a diaphragm 125, the electric contact 124, and the imaging optical system that is composed of, for example, a lens assembly including a focusing lens.

The imaging lens driving mechanism 121 forms an optical image of a subject to be shot on the image sensor 103 by driving the lens assembly including a plurality of lenses so as to move the focus position, which is in the vicinity of an image capturing plane of the image sensor 103, in the optical axis direction. The lens CPU 122 receives focus adjustment information transmitted from the CPU 110 of the camera body 100 via the electric contact 124, and drives the imaging lens driving mechanism 121 based on the focus adjustment information.

The diaphragm driving mechanism 123 has a mechanism for driving the diaphragm 125 and an actuator therefor, and drives the diaphragm 125 in accordance with an instruction from the camera CPU 110.

[Image Capture Processing]

Figure 4:
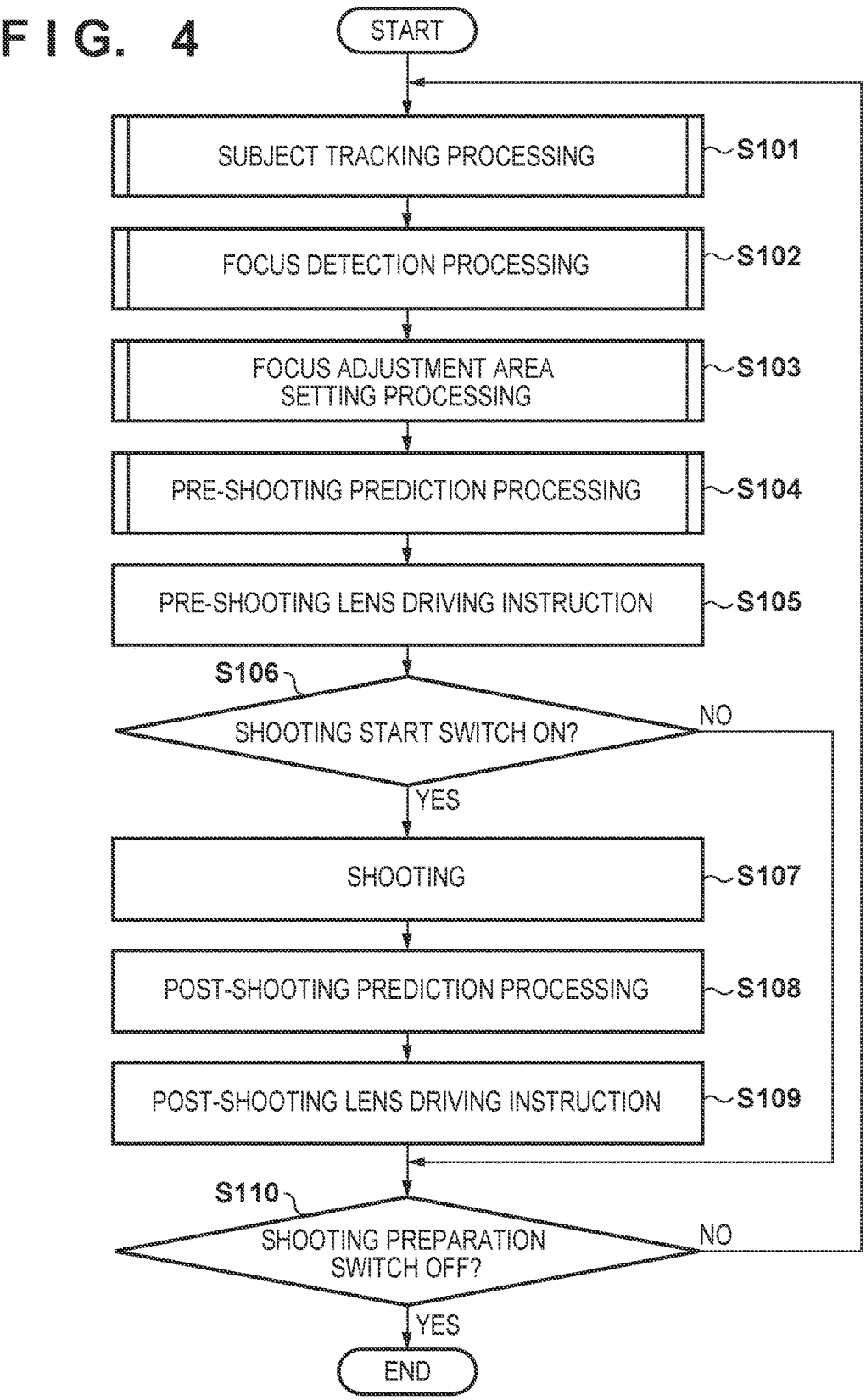
FIG. 4 is a flowchart of focus adjustment and image capture processing according to the embodiment.

Using FIG. 4, the following describes a flow of focus adjustment and image capture processing in the servo shooting mode according to the present embodiment. This processing is started when a shooting preparation instruction is issued by turning ON a shooting preparation switch. Note that in an ordinary camera, the shooting preparation switch is turned ON by pressing a switch serving as a shooting button halfway.

Once the processing has been started, in step S101, the subject tracking unit 116 executes subject tracking processing, and obtains an area of a subject to be tracked (tracking area), a position of the subject to be tracked (tracking position), and the reliability of the tracking position. The details of the subject tracking processing will be described later using FIGS. 5, 6A, and 6B. In the next step S102, focus detection processing is executed. The details of the focus detection processing will be described later using FIG. 7. Subsequently, in step S103, focus adjustment area setting processing is executed to set an area in which focus adjustment is to be performed (focus adjustment area). The details of the focus adjustment area setting processing will be described later using FIG. 8.

Figure 10:
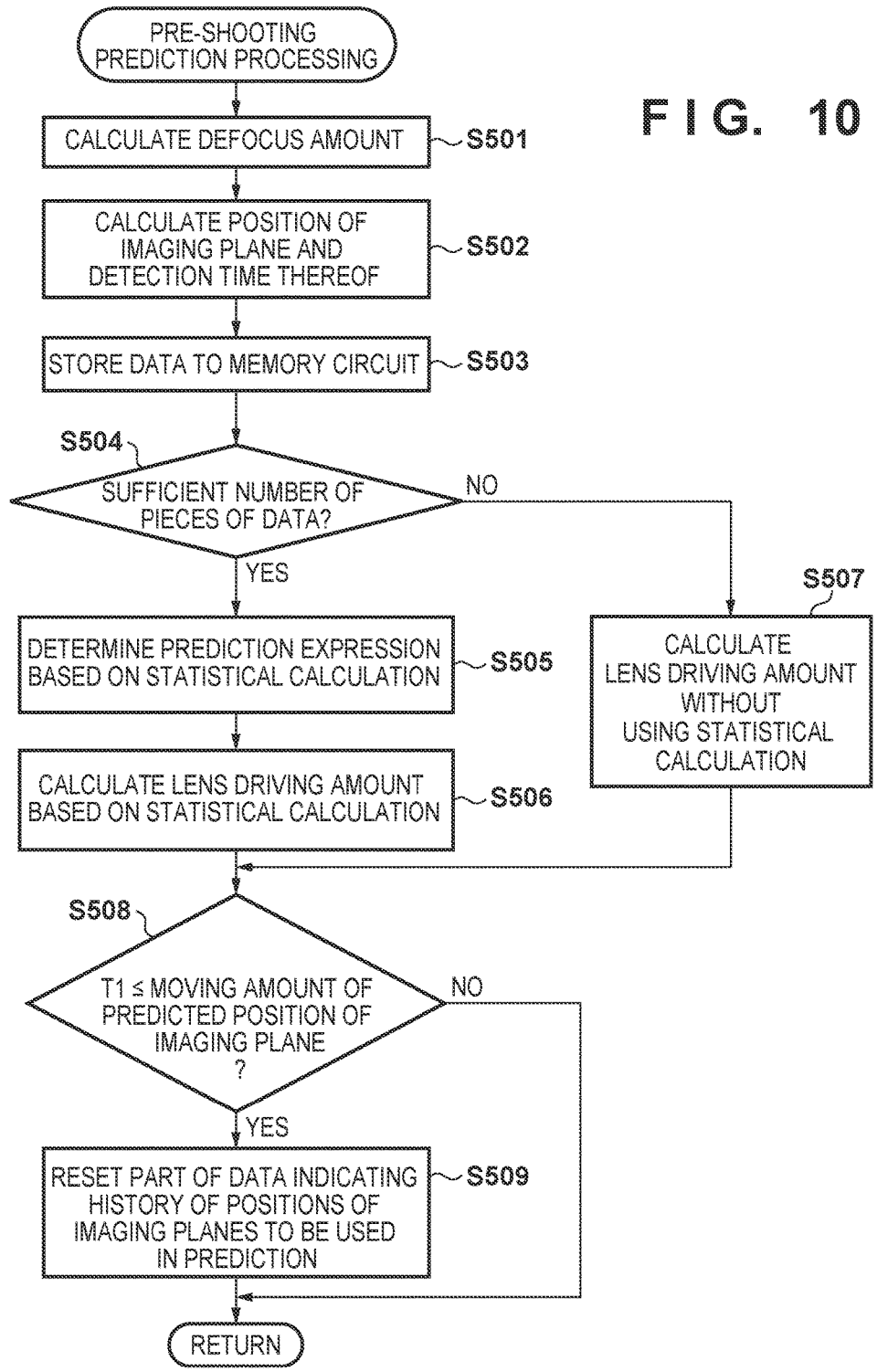
FIG. 10 is a flowchart of pre-shooting prediction processing according to the embodiment.

In step S104, pre-shooting prediction processing is executed. As will be described later, in the pre-shooting prediction processing, when a shooting start switch is in an ON state, the prediction unit 119 predicts a position of an imaging plane of the subject between when the phase-difference detection is performed in the focus detection processing in step S102 and when the image sensor 103 performs shooting. On the other hand, when the shooting start switch is in an OFF state, the prediction unit 119 predicts a position of the imaging plane of the subject until the next phase-difference detection. The details of a prediction method will be described later using FIG. 10.

In step S105, a lens driving amount that is necessary for moving the imaging lens 120 to focus on the position of the imaging plane of the subject predicted in step S104 is calculated, and the lens CPU 122 is informed of the lens driving amount.

Subsequently, in step S106, the state of the shooting start switch is determined; if the shooting start switch is in the ON state, step S107 follows to perform shooting, and if the shooting start switch is in the OFF state, step S110 follows. Note that in an ordinary camera, the shooting start switch is turned ON by fully pressing the switch serving as the shooting button.

In step S107, the image sensor control circuit 102 is instructed to drive and control the image sensor 103, and an image shot by the image sensor 103 is stored to the memory circuit 101. In step S108, the prediction unit 119 predicts a position of the imaging plane of the subject at the time of the next phase-difference detection, and in step S109, a lens driving amount that is necessary for moving the imaging lens 120 to focus on the position of the imaging plane predicted in step S108 is calculated, and the lens CPU 122 is informed of the lens driving amount.

In step S110, whether the shooting preparation switch is in the OFF state is determined; if the shooting preparation switch is in the OFF state, the focus adjustment and image capture processing is ended, and if the shooting preparation switch is in the ON state, the focus adjustment and image capture processing returns to step S101 to repeat the foregoing processes.

(Subject Tracking Processing)

Figure 5:
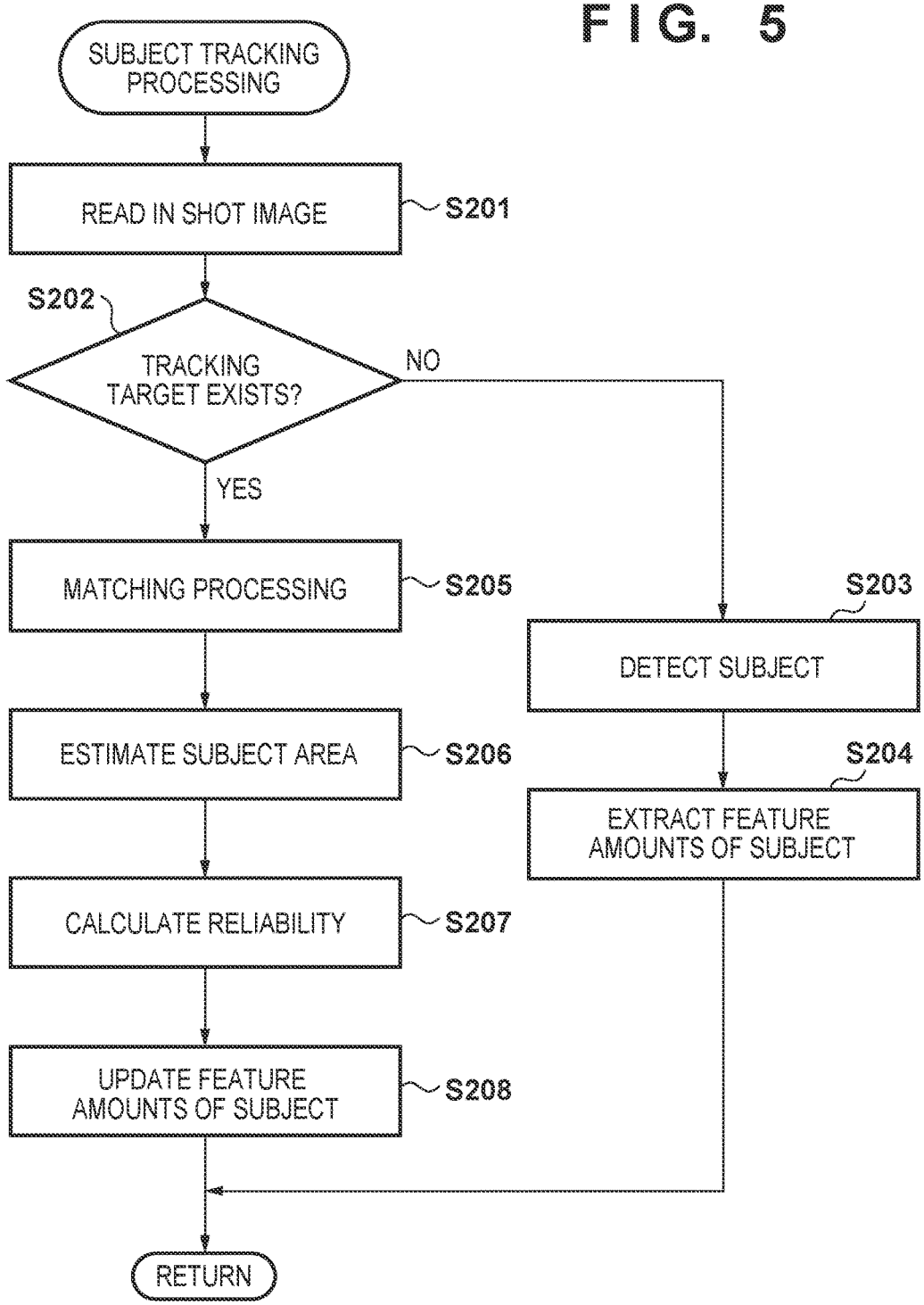
FIG. 5 is a flowchart of subject tracking processing according to the embodiment.

With reference to a flowchart of FIG. 5, the following describes an example of the subject tracking processing executed by the subject tracking unit 116 in step S101.

The following processing executed by the subject tracking unit 116 according to the present embodiment is a template matching method that uses a partial image showing a target subject as a template, cross-references a partial area of a supplied image with the template, and estimates an area with a small degree of difference by changing the partial area to be cross-referenced. In the present embodiment, in order to deal with scale conversion of the target subject in the time direction, feature colors of the subject are extracted, and a subject area is estimated based on the status of distribution of the feature colors within a shot image. The template is updated based on the estimated subject area.

First, in step S201, the image sensor 103 converts reflected light from a subject into electric signals, and image information is obtained by reading out the electric signals. The image information that has been read out is converted into digital signals and transmitted to the subject tracking unit 116.

In step S202, whether a subject serving as a tracking target exists is determined. If the subject serving as the tracking target exists, processes for tracking the subject are executed in steps S205 to S208. If the subject serving as the tracking target does not exist, subject detection is performed in step S203 to determine a subject serving as a tracking target.

A method of the subject detection performed in step S203 is broadly classified into two groups: a detection method based on an instruction from a photographer, and an automatic detection method. In the detection method based on an instruction from a photographer, a position of a subject within a shot image is designated via an input interface including, for example, a touchscreen and buttons, and a subject area is extracted based on information of the designated position. On the other hand, the automatic detection method is commonly implemented in the form of, for example, face detection. Examples of known face detection techniques include a method that uses face-related information (skin color information and parts, such as the eyes, nose, and mouth), and a method used in a classifier that performs face detection based on a learning algorithm, a typical example of which is a neural network. In general, face detection is performed using the foregoing methods in combination to improve a detection rate. A specific example is a face detection method described in Japanese Patent Laid-Open No. 2002-251380, which uses the wavelet transform and image feature amounts.

In step S204, feature amounts of the tracking target are extracted from the extracted subject area. In the present embodiment, an image pattern of the subject area is stored as feature amounts to execute the tracking processes based on template matching. Furthermore, a color histogram $H_{in}$ of the subject area is stored to perform subject area estimation based on a distribution of feature colors. Thereafter, a waiting state continues until a sampling period of the next shooting.

Figure 6A:
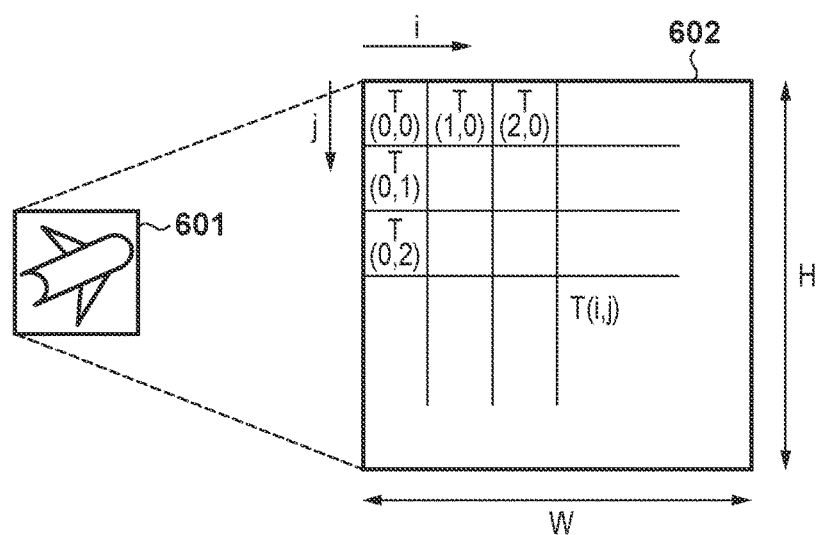
FIGS. 6A and 6B show an example of template matching according to the embodiment.

A description is now given of tracking processes that are executed if it is determined that the subject serving as the tracking target exists in step S202. In this case, matching processing is executed in step S205. The details of template matching will be explained below with reference to FIGS. 6A and 6B. FIG. 6A shows an example of a subject model (template) used in template matching. Reference numeral 601 denotes a partial image (template) showing the subject serving as the tracking target, and a pixel pattern of this partial image is used as feature amounts. Reference numeral 602 represents the feature amounts of the template 601, and luminance signals of pixel data indicate the feature amounts. A feature amount T(i, j) is expressed by Expression (1) provided that, within a template area, the coordinates are denoted by (i, j), the number of pixels in the horizontal direction is W, and the number of pixels in the vertical direction is H.

$$T(i,j)=\{T(0,0),T(1,0),\ldots,T(W\text{-}1,H\text{-}1)\} \quad (1)$$

Figure 6B:
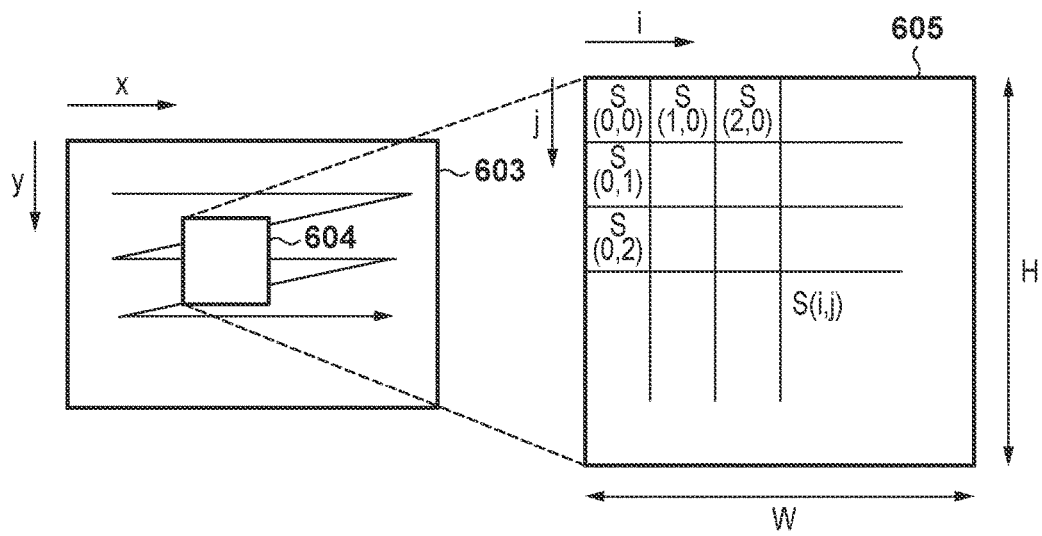

FIG. 6B shows information of an image used in search for the subject serving as the tracking target. Reference numeral 603 denotes a range of an image to which matching processing is applied (search range). The coordinates in the search range 603 are denoted by (x, y). Reference numeral 604 denotes a partial area from which a matching evaluation value is obtained. Reference numeral 605 represents feature amounts in the partial area 604, and similarly to the template 601, luminance signals of image data indicate the feature amounts. A feature amount S(i, j) is expressed by Expression (2) provided that, within the partial area, the coordinates are denoted by (i, j), the number of pixels in the horizontal direction is W, and the number of pixels in the vertical direction is H.

$$S(i,j)=\{S(0,0),S(1,0),\ldots,S(W\text{-}1,H\text{-}1)\} \quad (2)$$

The sum of absolute differences (SAD) is used as a calculation method for evaluating the similarity between the template 601 and the partial area 604. An SAD value is calculated using Expression (3).

$$V(x,y)=\Sigma_{y=0}^{H-1}\Sigma_{x=0}^{W-1}|T(i,j)-S(i,j)| \quad (3)$$

SAD values V(x, y) are calculated while shifting the partial area 604 by one pixel at a time, starting from the upper-left corner of the search range 603. The coordinates (x, y) at which the minimum SAD value V(x, y) has been calculated indicates a position that is most similar to the template 601. In other words, there is a high possibility that the subject serving as the tracking target exists at the position with the minimum SAD value V(x, y) in the search range 603.

Although one-dimensional information of luminance signals is used as feature amounts in the foregoing example, three-dimensional information of, for example, brightness signals, hue signals, and saturation signals may be used as feature amounts. Furthermore, rather than the above-described SAD values, values obtained by a different calculation method, such as normalized correlation coefficients (NCC), may be used as matching evaluation values.

Subsequently, in step S206, an area of the subject serving as the tracking target (hereinafter, "tracking area") is detected based on the position detected in the matching processing in step S205. Using Expression (4), information amounts are calculated from the color histogram within a tracking area, which was stored in step S204, and a color histogram $H_{out}$ of an entirety or a part of a shot image of the current time.

$$I(a)=-\log_2 H_{in}(a)/H_{out}(a) \quad (4)$$

Each information amount is obtained from a corresponding bin of the color histograms, and indicates the occurrence probability within the subject area relative to an entirety or a part of the image. A map indicating the possibility of existence of the subject serving as the tracking target can be obtained by processing the pixels in the shot image of the current time based on these information amounts. A tracking area is detected based on this map. The subject tracking unit 116 outputs the position of the center of mass of the detected tracking area as the tracking position.

Subsequently, in step S207, the reliability of the tracking position calculated in step S206 is calculated. The certainty of subject tracking is interfered by various factors, including a change in the subject, the existence of a similar subject, and accumulation of tracking errors. The reliability is calculated by multiplying these factors by various types of evaluation values obtained through the matching processing and tracking area estimation.

The larger the minimum value V(x, y) obtained in the matching processing using Expression (3), the larger the change in the subject. In view of this, the reliability is set such that the larger the minimum value, the lower the reliability. Furthermore, there is a high possibility that a similar subject exists when a value that is similar to the minimum value V(x, y) obtained in the matching processing using Expression (3) is obtained at a position that is distant from the estimated position of the subject by a predetermined threshold or more. In view of this, the reliability is set such that the higher the degree of similarity between the SAD value obtained at the position that is distant from the estimated position of the subject by the predetermined threshold or more and the minimum SAD value, the lower the reliability. Moreover, the smaller the entropy (the average, or expected, value) of the information amounts within the subject area, which are obtained using Expression (4) to indicate the color features of the subject, the larger the change in the subject. This entropy is expressed by Expression (5).

$$E_{in}=-\Sigma_{a=1}^{N}H_{in}(a)I(a) \quad (5)$$

The reliability is set such that the smaller the value given by Expression (5), the smaller the reliability. Furthermore, the larger the entropy (the average, or expected, value) of the information amounts outside the subject area, which are obtained using Expression (4) to indicate the color features of the subject, the higher the possibility of existence of a similar target. This entropy is expressed by Expression (6).

$$E_{out}=-\Sigma_{a=1}^{N}H_{out}(a)I(a) \quad (6)$$

The reliability is set such that the larger the value given by Expression (6), the smaller the reliability. In addition, once the certainty of subject tracking has dropped, the reliability of tracking also drops thereafter. In view of this, the reliability is calculated in consideration of a history of reliabilities. For example, an average reliability value within a predetermined period is used as the reliability of a current frame. The reliability of the tracking position is calculated as described above.

Subsequently, in step S208, the feature amounts of the subject are updated. Specifically, the template is updated based on the tracking area estimated in step S206, thereby making it possible to deal with a change in the scale of the subject. This marks the end of the subject tracking processing, and thereafter, a waiting state continues until a sampling period of the next shooting.

(Focus Detection Processing)

Figure 7:
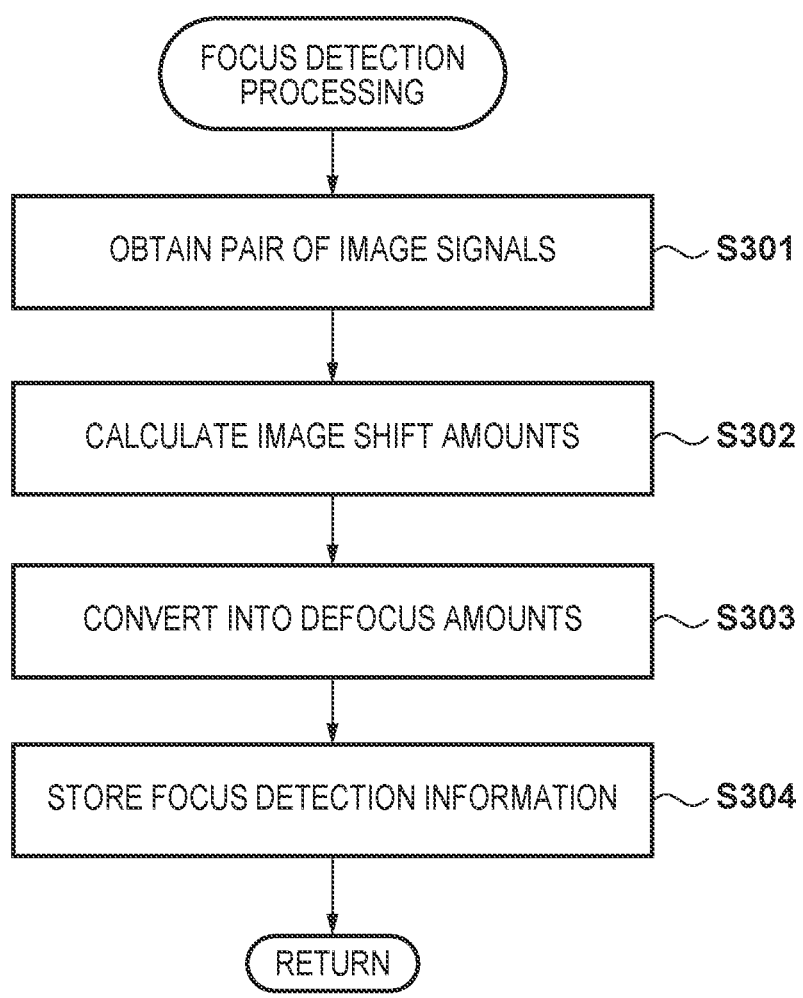
FIG. 7 is a flowchart of focus detection processing according to the embodiment.

Based on a flowchart of FIG. 7, the following describes exemplary operations of the focus detection processing executed in step S102. In step S301, a pair of image signals A and B output from the image sensor 103 is obtained. In step S302, the phase-difference detection unit 111 calculates a phase difference between the image signals A and B obtained in step S301 (an image shift amount) in each of a plurality of areas including the tracking area detected in step S101, an area obtained from a history of past focus detection areas, and a preset area. Subsequently, in step S303, the defocus amount conversion unit 112 converts the image shift amounts calculated in step S302 into defocus amounts. Then, in step S304, the obtained focus detection information is stored to the memory circuit 101. Specifically, for each area, a position of an imaging plane and the shooting time thereof are stored.

(Focus Adjustment Area Setting Processing)

Figure 8:
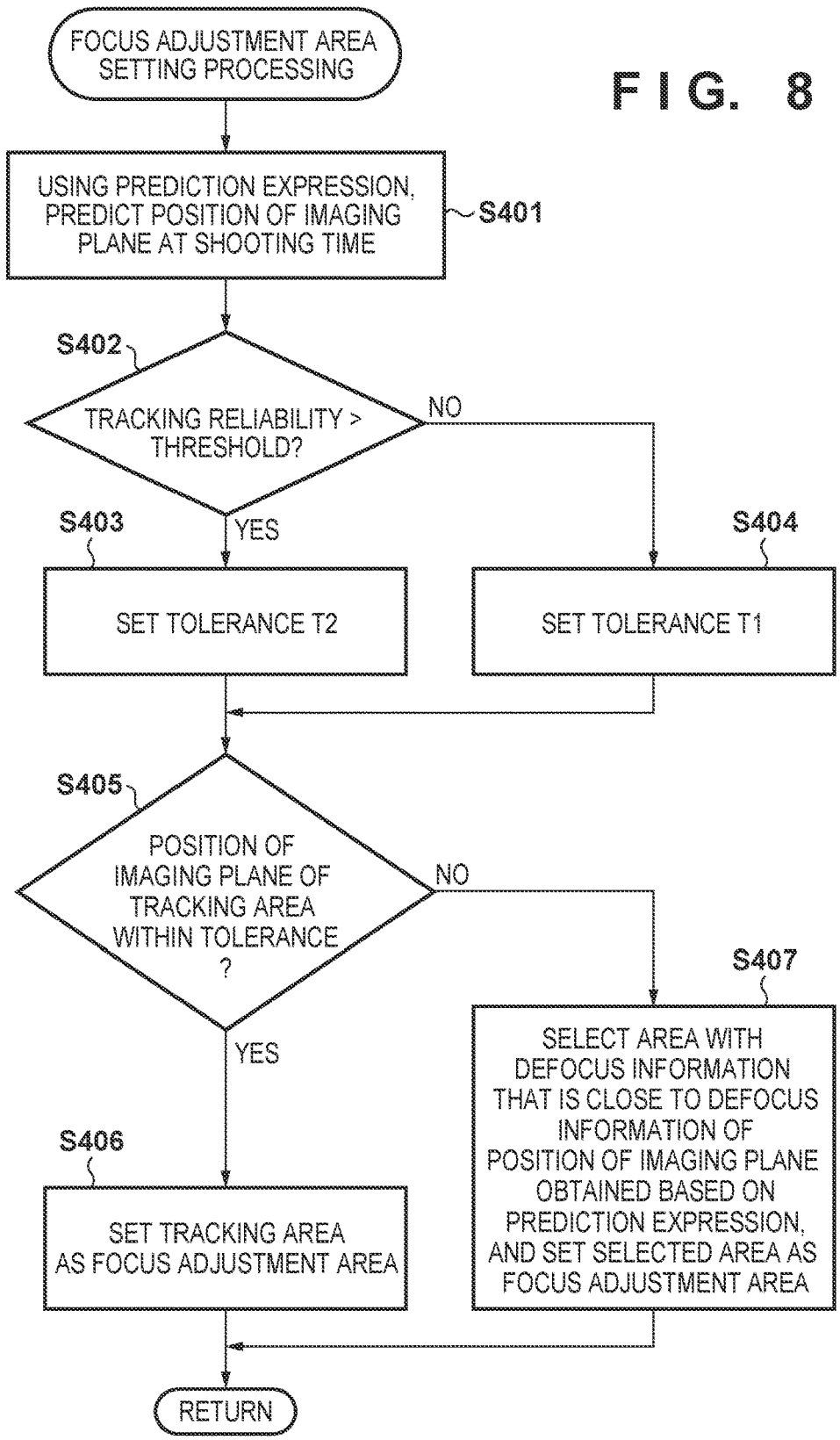
FIG. 8 is a flowchart of focus detection area setting processing according to the embodiment.

With reference to a flowchart of FIG. 8, the following describes the focus adjustment area setting processing executed in step S103.

First, in step S401, a position of an imaging plane of the subject at the time of shooting performed by the image sensor 103 is predicted using a prediction expression that was calculated in previous prediction processing, which will be described later, to predict a position of an imaging plane of the subject.

Figure 9A:
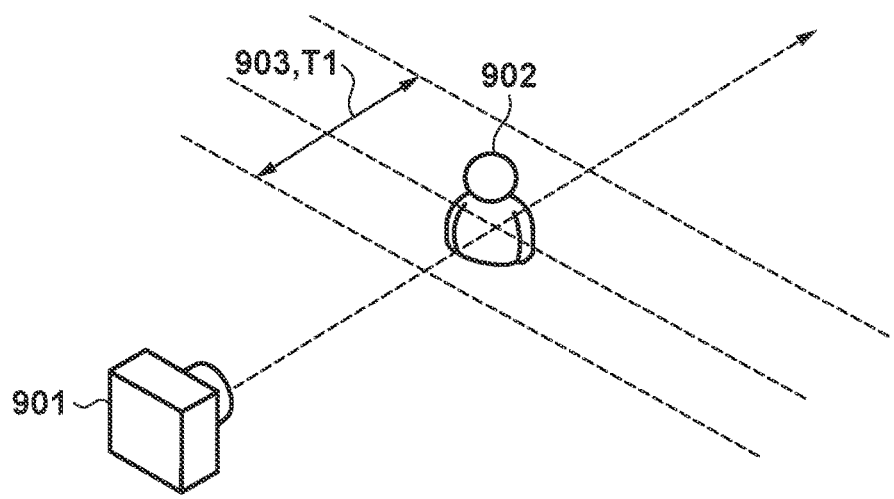
FIGS. 9A and 9B illustrate setting of a threshold in the imaging plane direction according to the embodiment.
Figure 9B:
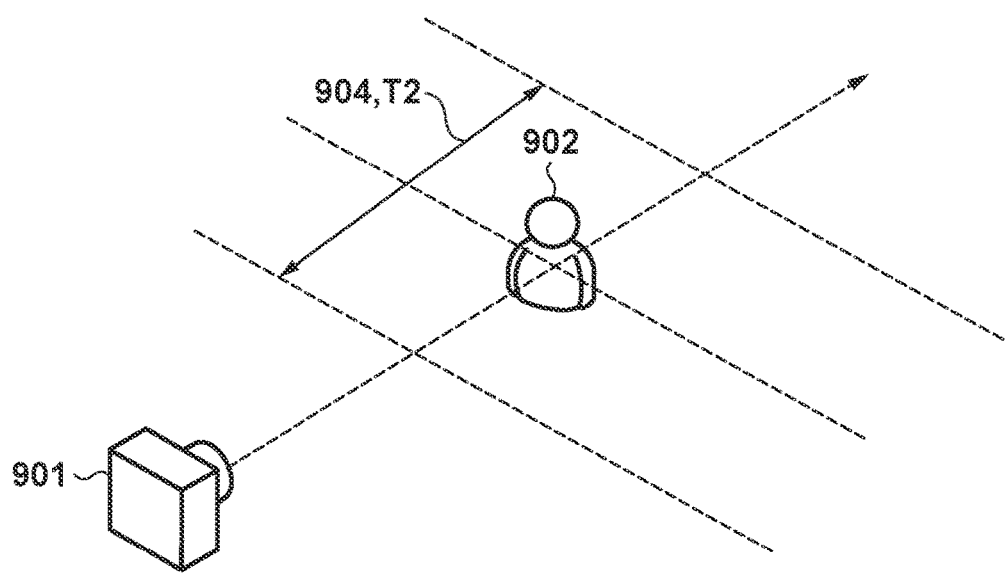

Subsequently, in step S402, whether the reliability of the tracking position calculated by the subject tracking unit 116 in step S101 is higher than a preset threshold is determined. With reference to FIGS. 9A and 9B, a description is now given of the concept of tolerance that is set for the position of the imaging plane predicted in step S401 based on the reliability of the tracking position. FIG. 9A shows an image capturing apparatus 901, a subject 902 serving as a tracking target, and a tolerated moving range 903 of the subject for a case in which the reliability of the tracking position is low. FIG. 9B shows a tolerated moving range 904 for a case in which the reliability of the tracking position is high. If the reliability of the tracking position is higher than the threshold, in step S403, an imaging plane tolerance (an imaging plane tolerated moving range) T2 corresponding to the moderately wide tolerated moving range 904 is set as shown in FIG. 9B. On the other hand, if the reliability of the tracking position is equal to or lower than the threshold, in step S404, an imaging plane tolerance T1 corresponding to the normal tolerated moving range 903 is set as shown in FIG. 9A.

Subsequently, in step S405, whether the position of the imaging plane of the tracking area calculated in step S101 is within the tolerance set in step S403 or S404 is determined. If the position is within the tolerance (YES of step S405), the tracking area is set as the focus adjustment area in step S406. On the other hand, if the position of the imaging plane of the tracking area is not within the tolerance (NO of step S405), an area with a defocus amount that is close to a defocus amount at the position of the imaging plane obtained in step S401 based on the prediction expression is selected from among the areas in which the defocus amounts were obtained in step S102, and the selected area is set as the focus adjustment area in step S407. If there is no area with a defocus amount that is close to the defocus amount at the position of the imaging plane obtained based on the prediction expression, then focus adjustment is not performed.

As described above, when the reliability of the tracking position is high, a large tolerance is set in the imaging plane direction. Therefore, even if the tracked subject moves significantly in the imaging plane direction, focus adjustment can be performed based on defocus information of a tracking area of the tracked subject. On the other hand, when the reliability of the tracking position is low, a small tolerance is set in the imaging plane direction. This prevents a major failure in focus adjustment, even in the case of erroneous subject tracking.

(Pre-Shooting Prediction Processing)

The following describes the pre-shooting prediction processing, which is executed by the prediction unit 119 in step S104 to predict a position of a future imaging plane from changes in the positions of a plurality of past imaging planes and in the shooting times thereof. A method of predicting a position of a future imaging plane is elaborated in Japanese Patent Laid-Open No. 2001-21794; the following description of the present embodiment deals with an example in which the prediction is performed using statistical calculation with reference to a flowchart of FIG. 10.

First, in step S501, the defocus amount conversion unit 112 calculates a defocus amount from a phase difference that was detected by the phase-difference detection unit 111 from the focus adjustment area set in step S103. In the next step S502, a position of an imaging plane corresponding to the calculated defocus amount and the shooting time thereof are calculated. In general, a certain charge accumulation period is required to obtain image signals from the image sensor 103. Therefore, a midpoint between the accumulation start time and the accumulation end time is used as the shooting time, and a position of an imaging plane of the subject is calculated by adding the defocus amount to a relative extension amount of the imaging lens 120.

In the next step S503, data composed of the pair of the position of the imaging plane and the shooting time is stored to the memory circuit 101. The structure of data stored in the memory is in the form of a queue; pieces of data are sequentially stored until the number of stored pieces of data reaches a preset number, and thereafter, the newest piece of data is stored by overwriting the oldest piece of data.

In the next step S504, whether the number of pieces of data stored in the memory circuit 101 is sufficient to perform the statistical calculation is determined. If it is determined that the number of stored pieces of data is sufficient to perform the statistical calculation, the pre-shooting prediction processing proceeds to step S505, and a prediction expression is determined based on the statistical calculation.

In step S505, coefficients $\alpha$, $\beta$, and $\gamma$ are statistically determined by multiple regression analysis using a prediction function f(t) shown in Expression (7); the determination of the prediction expression based on the statistical calculation is elaborated in Japanese Patent Laid-Open No. 2001-21794, and thus a detailed description thereof will be omitted. A value of n in Expression (7) yields the smallest prediction error when prediction is performed with respect to samples of a plurality of representative shooting scenes related to moving body prediction.

$$f(t) = \alpha + \beta t + \gamma t^n \tag{7}$$

After the prediction expression has been determined in step S505, the pre-shooting prediction processing proceeds to step S506 in which a position of an imaging plane at the preset future time is predicted, and a lens driving amount that is necessary for the imaging lens 120 to focus on the predicted position of the imaging plane is calculated.

On the other hand, if it is determined that the number of stored pieces of data is not sufficient in step S504, the pre-shooting prediction processing proceeds to step S507 in which a lens driving amount is calculated based on the calculated defocus amount without using the statistical calculation.

Subsequently, the focus adjustment area setting unit 115 determines a difference between the position of the imaging plane calculated in step S506 or the position of the imaging plane corresponding to the defocus amount calculated in step S507 and the position of the imaging plane of the focus detection area set in step S406 or S407 of FIG. 8. Specifically, in step S508, the relationship between the tolerance T1 set in S404 and the difference between the positions of the imaging planes is determined. If the difference between the positions of the imaging planes is within the tolerance T1 (NO of step S508), no additional processing is executed in particular, and the pre-shooting prediction processing is ended. On the other hand, if the difference between the positions of the imaging planes is equal to or larger than the tolerance T1 (YES of step S508), a part of data indicating a history of the positions of imaging planes to be used next by the prediction unit 119 is reset in step S509. For example, a certain number or a certain percentage of pieces of data is deleted in chronological order. Reducing the effects by information of the positions of past imaging planes increases the precision of prediction with respect to a tracked subject that moves irregularly in the optical axis direction.

As described above, according to the present embodiment, the image capturing apparatus that performs focus adjustment in accordance with subject tracking based on image features can prevent a malfunction caused by erroneous tracking, and perform appropriate focus adjustment with respect to a subject that moves irregularly in the optical axis direction.

Although the foregoing embodiment has dealt with a case in which one of the two types of tolerances is set, the present invention is not limited in this way; alternatively, a plurality of tolerances may be prepared, and one of the plurality of tolerances may be set in such a manner that the set tolerance increases in stages as the reliability increases. Alternatively, a tolerance may increase seamlessly as the reliability increases.

Other Embodiments

The present invention may be applied to a system composed of a plurality of devices, or to an apparatus composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-131036, filed on Jun. 30, 2016 which is hereby incorporated by reference herein in its entirety.

What is claimed is:

1. A focus adjusting apparatus, comprising at least one processor executing computer instructions stored in computer memory, or one circuitry, configured to function as:
    a tracking unit that detects an area corresponding to a subject to be tracked, and detects reliability of the area from an image signal corresponding to the area that has been output from an image sensor;
    a calculator that calculates a position of an imaging plane of the area;
    a prediction unit that predicts a position of an imaging plane at a time corresponding to a timing when the image signal is generated in the image sensor based on a history of positions of imaging planes of a focus adjustment area;
    a setting unit that sets a tolerance for positions of imaging planes based on the reliability; and
    a determination unit that determines the area corresponding to the subject as the focus adjustment area in a case where a difference between the position of the imaging plane calculated by the calculator and the position of the imaging plane predicted by the prediction unit is within the tolerance.

2. The focus adjusting apparatus according to claim 1, wherein the setting unit sets a first tolerance in a case where the reliability is equal to or lower than a preset threshold, and sets a second tolerance greater than the first tolerance when the reliability is higher than the preset threshold.

3. The focus adjusting apparatus according to claim 1, wherein the setting unit increases the tolerance in stages as the reliability increases.

4. The focus adjusting apparatus according to claim 1, wherein the setting unit increases the tolerance as the reliability increases.

5. The focus adjusting apparatus according to claim 1, wherein in a case where a difference between the position of the imaging plane of the focus detection area determined by the determination unit and the position of the imaging plane predicted based on the history of positions of imaging planes at the preset future time point is not within the tolerance, at least a part of the history of positions of imaging planes is deleted in chronological order.

6. The focus adjusting apparatus according to claim 1, wherein in a case where the difference between the position of the imaging plane predicted by the prediction unit and the position of the imaging plane calculated by the calculator is not within the tolerance, the determination unit determines an area with an imaging plane whose position is close to the position of the imaging plane predicted by the prediction unit as the focus adjustment area.

7. The focus adjusting apparatus according to claim 6, wherein in a case where there is no area with an imaging plane whose position is close to the position of the imaging plane predicted by the prediction unit, focus detection is not performed.

8. The focus adjusting apparatus according to claim 1, wherein the tracking unit uses the area of the subject to be tracked as a template, obtains evaluation values by crossreferencing partial areas of the image signal with the template, and obtains the reliability in accordance with a distribution of the evaluation values.

9. The focus adjusting apparatus according to claim 1, wherein the tracking unit estimates the area of the subject based on a distribution of feature colors of the subject in the image signal, and obtains the reliability based on a distribution of the feature colors inside the area of the subject and on a distribution of the feature colors outside the area of the subject.

10. The focus adjusting apparatus according to claim 1, wherein the tracking unit obtains the reliability in the image signal with reference to a history of reliabilities.

11. The focus adjusting apparatus according to claim 1, the processor or the circuitry further functions as a controller that controls a driving of focusing lens to focus on the focus adjustment area.

12. The focus adjusting apparatus according to claim 11, wherein the controller calculates a driving amount by which a focusing lens is to be driven to focus on the focus adjustment area.

13. The focus adjusting apparatus according to claim 12, wherein the prediction unit further predicts a position of an imaging plane of the subject included in the focus adjustment area at a preset future time point, and the controller calculates the driving amount so as to focus on the predicted position of the imaging plane at the preset future time point.

14. The focus adjusting apparatus according to claim 1, wherein the prediction unit further predicts a position of an imaging plane of the subject included in the focus adjustment area at a preset future time point.

15. An image capturing apparatus, comprising at least one processor executing computer instructions stored in computer memory, or one circuitry, configured to function as:
an image sensor that outputs an image signal through photoelectric conversion of light incident thereon; and
the focus adjusting apparatus that includes:
a tracking unit that detects an area corresponding to a subject to be tracked, and detects reliability of the area from the image signal corresponding to the area that has been output from the image sensor;
a calculator that calculates a position of an imaging plane of the area;
a prediction unit that predicts a position of an imaging plane at a time corresponding to a timing when the image signal is generated in the image sensor based on a history of positions of imaging planes of a focus adjustment area;
a setting unit that sets a tolerance for positions of imaging planes based on the reliability; and
a determination unit that determines the area corresponding to the subject as the focus adjustment area in a case where a difference between the position of the imaging plane calculated by the calculator and the position of the imaging plane predicted by the prediction unit is within the tolerance.

16. A focus adjusting method, comprising:
detecting an area corresponding to a subject to be tracked, and detects reliability of the area from an image signal corresponding to the area that has been output from an image sensor;
calculating a position of an imaging plane of the area;
predicting a position of an imaging plane at a time corresponding to a timing when the image signal is generated in the image sensor based on a history of detected positions of imaging planes of a focus adjustment area;
setting a tolerance for positions of imaging planes based on the detected reliability; and
determining the area corresponding to the subject as the focus adjustment area in a case where a difference between the calculated position of the imaging plane and the predicted position of the imaging plane is within the tolerance.

17. A non-transitory computer-readable storage medium having stored therein a program, which, when executed by a processor, causes a computer or circuitry to function as each unit of the a focus adjusting apparatus that comprises:
a tracking unit that detects an area corresponding to of a subject to be tracked, and detects reliability of the area from an image signal corresponding to the area that has been output from an image sensor;
a calculator that calculates a position of an imaging plane of the area;
a prediction unit that predicts a position of an imaging plane at a time corresponding to a timing when the image signal is generated in the image sensor based on a history of positions of imaging planes of a focus adjustment area;
a setting unit that sets a tolerance for positions of imaging planes based on the reliability; and
a determination unit that determines the area corresponding to the subject as the focus adjustment area in a case where a difference between the position of the imaging plane calculated by the calculator and the position of the imaging plane predicted by the prediction unit is within the tolerance.

* * * * *